US011754417B2

(12) United States Patent
Sano et al.

(10) Patent No.: US 11,754,417 B2
(45) Date of Patent: Sep. 12, 2023

(54) INFORMATION GENERATING DEVICE, VEHICLE CONTROL SYSTEM, INFORMATION GENERATION METHOD, AND COMPUTER PROGRAM PRODUCT

(71) Applicant: KABUSHIKI KAISHA TOSHIBA, Tokyo (JP)

(72) Inventors: Yuma Sano, Tokyo (JP); Akihito Seki, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 209 days.

(21) Appl. No.: 17/180,906

(22) Filed: Feb. 22, 2021

(65) Prior Publication Data
US 2022/0074761 A1 Mar. 10, 2022

(30) Foreign Application Priority Data

Sep. 10, 2020 (JP) .................. 2020152339

(51) Int. Cl.
*G01C 21/36* (2006.01)
*B60W 40/06* (2012.01)

(52) U.S. Cl.
CPC ......... *G01C 21/3691* (2013.01); *B60W 40/06* (2013.01); *B60W 2552/35* (2020.02); *B60W 2554/20* (2020.02); *B60W 2554/60* (2020.02); *B60W 2555/20* (2020.02); *B60W 2556/50* (2020.02)

(58) Field of Classification Search
None
See application file for complete search history.

(56) References Cited

U.S. PATENT DOCUMENTS

| 10,255,525 B1* | 4/2019 | Totolos, Jr. ........... B60W 10/18 |
| 10,599,155 B1* | 3/2020 | Konrardy ............. G06N 3/0454 |
| 11,012,683 B1* | 5/2021 | Beach .................. H04N 17/002 |
| 11,302,156 B1* | 4/2022 | Gordiichuk ...... G08B 13/19684 |
| 2017/0072850 A1* | 3/2017 | Curtis .................... G08G 1/166 |
| 2017/0294119 A1 | 10/2017 | Tamura et al. |

(Continued)

FOREIGN PATENT DOCUMENTS

| JP | 2014-106897 A | 6/2014 |
| JP | 2017107429 A * | 6/2017 |

(Continued)

*Primary Examiner* — David P. Merlino
(74) *Attorney, Agent, or Firm* — Finnegan, Henderson, Farabow, Garrett & Dunner, LLP

(57) ABSTRACT

An information generating device according to an embodiment includes one or more hardware processors. The one or more hardware processors: acquire environmental information indicating a state of environment around a vehicle; acquire abnormality information indicating an abnormality on a road, the abnormality having possibility of affecting traveling of the vehicle; acquire vehicle information including at least one of information on a traveling operation of the vehicle and information on specifications of the vehicle; and generate notification information indicating an operation to be performed by the vehicle against the abnormality on the road, the notification information being generated based on the environmental information, the abnormality information, and the vehicle information.

15 Claims, 9 Drawing Sheets

(56) References Cited

U.S. PATENT DOCUMENTS

| | | | |
|---|---|---|---|
| 2018/0032078 A1* | 2/2018 | Ferguson | G06V 20/58 |
| 2020/0103907 A1* | 4/2020 | Kaji | G05D 1/0214 |
| 2020/0264005 A1* | 8/2020 | Heo | G01C 21/3629 |
| 2020/0284593 A1* | 9/2020 | Watanabe | G01C 21/32 |
| 2021/0094539 A1* | 4/2021 | Beller | B60W 30/0956 |
| 2022/0001872 A1* | 1/2022 | Taieb | G01C 21/20 |
| 2022/0032955 A1* | 2/2022 | Xiang | G06V 20/56 |
| 2022/0343757 A1* | 10/2022 | Uchiyama | B60Q 1/26 |

FOREIGN PATENT DOCUMENTS

| | | | |
|---|---|---|---|
| JP | 2017-182498 A | | 10/2017 |
| JP | 6327283 B2 | | 5/2018 |
| JP | 2019-175020 A | | 10/2019 |

\* cited by examiner

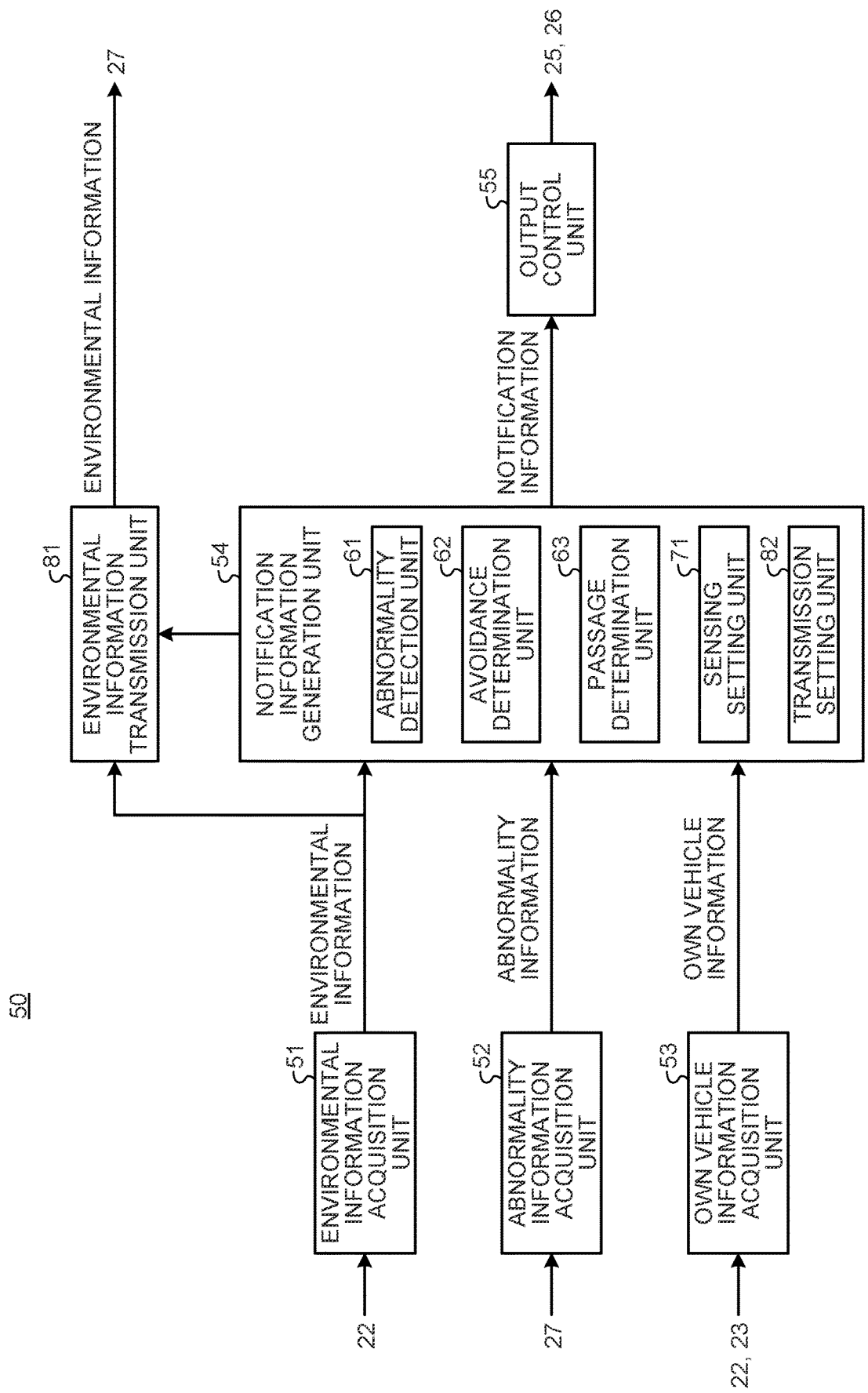

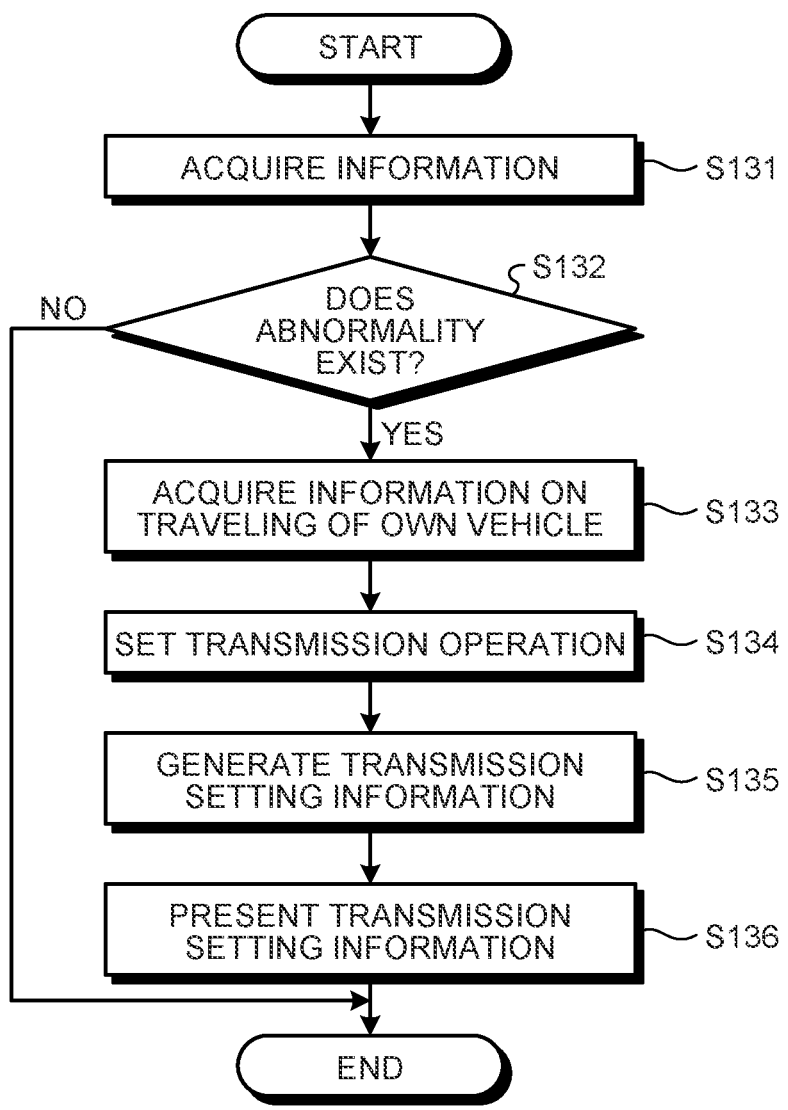

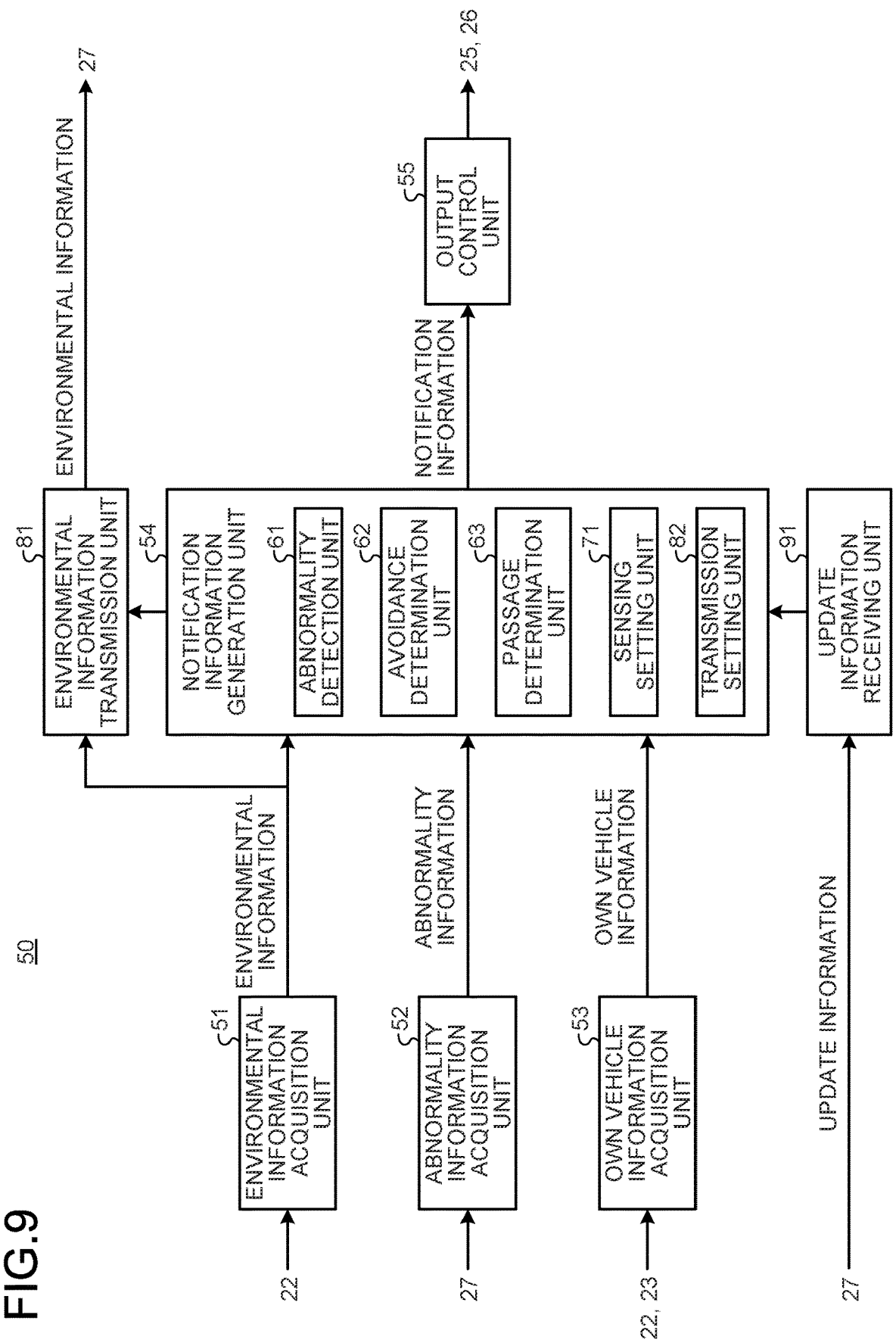

INFORMATION GENERATING DEVICE, VEHICLE CONTROL SYSTEM, INFORMATION GENERATION METHOD, AND COMPUTER PROGRAM PRODUCT

CROSS-REFERENCE TO RELATED APPLICATIONS

This application is based upon and claims the benefit of priority from Japanese Patent Application No. 2020-152339, filed on Sep. 10, 2020; the entire contents of which are incorporated herein by reference.

FIELD

Embodiments described herein relate to an information generating device, a vehicle control system, an information generation method, and a computer program product.

BACKGROUND

There has been known a method for making a vehicle avoid an abnormality on a road by distributing abnormality information indicating contents of the abnormality on the road, such as deterioration of the road or an obstacle, from an external database to a traveling vehicle. For example, there has been known a technique of analyzing obstacle information in a database, excluding analysis results with low confidence, and notifying a driver of analysis results with high confidence. Moreover, for example, there has been known a technique of determining whether or not a vehicle can pass an obstacle according to a height of the obstacle and speed of the vehicle, and when the vehicle can pass the obstacle, allowing the vehicle to pass the obstacle, and when the vehicle cannot pass the obstacle, causing the vehicle to slow down or change the course.

However, even if a driver has been notified of the obstacle information with high confidence, information indicating how to deal with the obstacle has not been given. In addition, even if such information had been given, an appropriate traveling operation may not have been provided.

BRIEF DESCRIPTION OF THE DRAWINGS

FIG. 7 is a configuration diagram of an information generating device according to a third embodiment;

FIG. 8 is a flowchart illustrating a processing flow of the information generating device according to the third embodiment; and FIG. 9 is a configuration diagram of an information generating device according to a fourth embodiment.

DETAILED DESCRIPTION

An information generating device according to an embodiment includes one or more hardware processors. The one or more hardware processors are configured to: acquire environmental information indicating a state of environment around a vehicle; acquire abnormality information indicating an abnormality on a road, the abnormality having possibility of affecting traveling of the vehicle; acquire vehicle information including at least one of information on a traveling operation of the vehicle and information on specifications of the vehicle; and generate notification information indicating an operation to be performed by the vehicle against the abnormality on the road, the notification information being generated based on the environmental information, the abnormality information, and the vehicle information.

Hereinafter, embodiments of the present disclosure will be described with reference to the drawings.

First Embodiment

Figure 1:
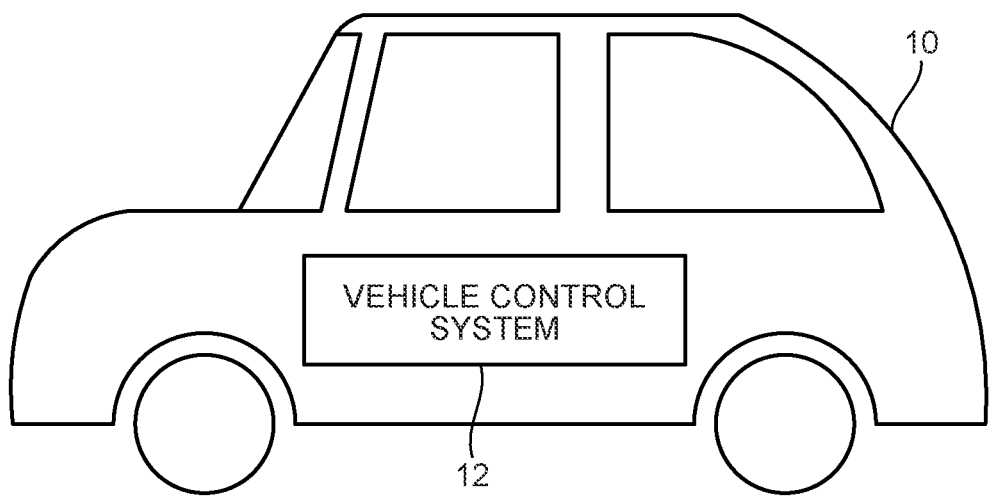
FIG. 1 is a diagram illustrating a vehicle according to an embodiment.

FIG. 1 is a diagram illustrating a vehicle 10 according to a first embodiment. The vehicle 10 is, for example, an automobile or a motorbike.

The vehicle 10 is equipped with a vehicle control system 12. The vehicle control system 12 is a device including, for example, a dedicated or general purpose computer. An information processing function of the vehicle control system 12 may not be installed in the vehicle 10, but may be installed in external equipment such as a cloud system connected to the vehicle 10 over a network.

Figure 2:
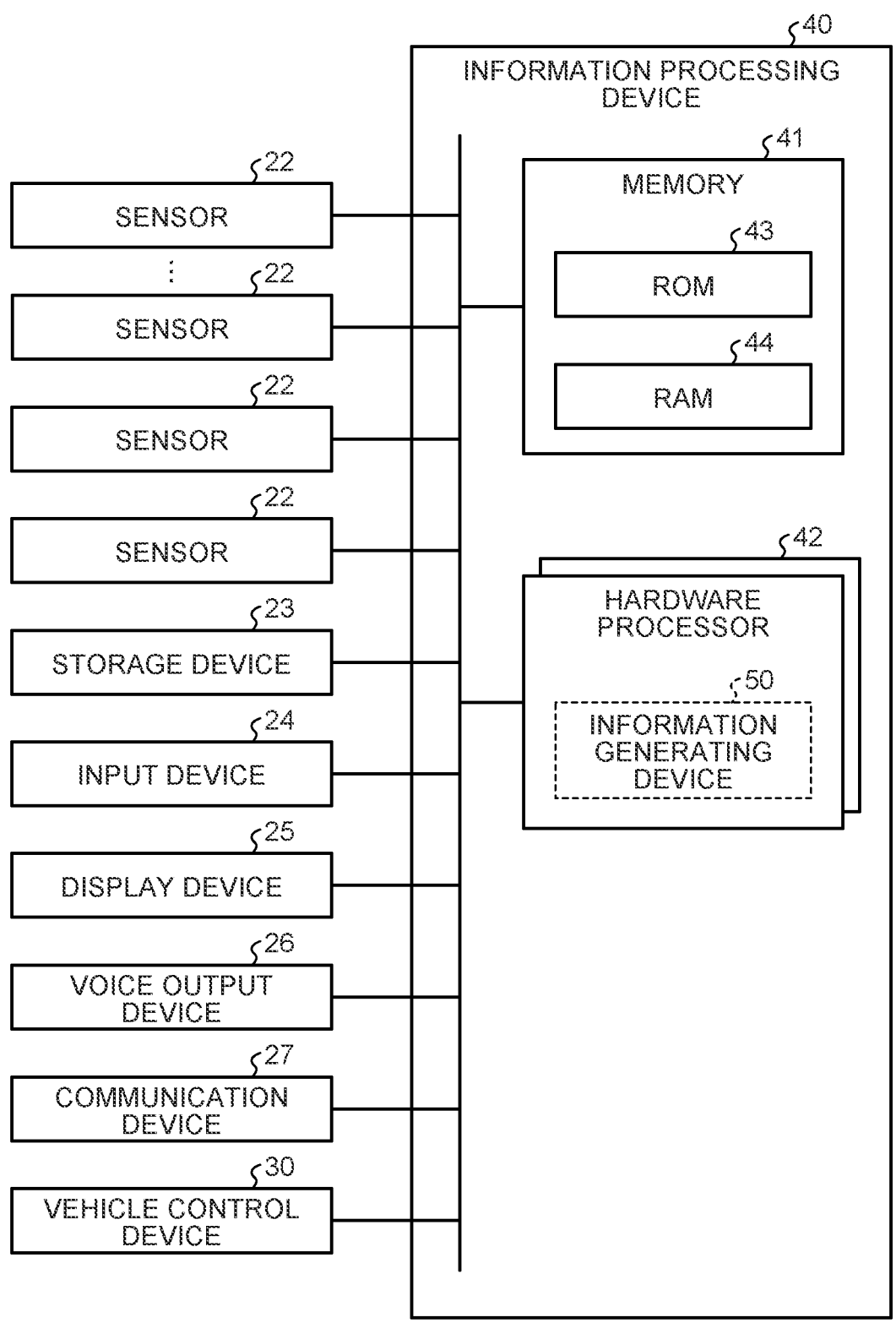
FIG. 2 is a configuration diagram of a vehicle control system.

FIG. 2 is a diagram illustrating an example of a configuration of the vehicle control system 12 according to the first embodiment. The vehicle control system 12 includes one or more sensors 22, a storage device 23, an input device 24, a display device 25, a voice output device 26, a communication device 27, a vehicle control device 30, and an information processing device 40.

The one or more sensors 22 are installed in the vehicle 10. At least part of the one or more sensors 22 detects sensor information indicating a state of environment around an own vehicle (the vehicle 10). For example, one of the one or more sensors 22 is an imaging device that images surroundings of the vehicle 10 from a fixed position on the vehicle 10. The imaging device is, for example, a monocular camera. The imaging device may be a stereo camera or a depth camera. Also, for example, one of the one or more sensors 22 is, for example, a millimeter wave radar that measures distance, size, or relative velocity of the vehicle 10 with respect to a surrounding object. Moreover, for example, the one or more sensors 22 may include: sonar that detects an object around the vehicle 10 by sound waves and a geomagnetic sensor. Moreover, for example, one of the one or more sensors 22 is a position sensor that detects a position of the vehicle 10 based on, for example, a signal from a satellite or the like.

Moreover, at least part of the one or more sensors 22 detects sensor information indicating information on a traveling operation of the own vehicle (the vehicle 10). For example, the one or more sensors 22 may include a speed sensor that detects speed of the vehicle 10, an angular velocity sensor that detects angular velocity of the vehicle 10, and an acceleration sensor that detects translational acceleration of the vehicle 10.

The storage device 23 is a semiconductor memory element such as a hard disk drive, an optical disk drive, or a flash memory. The storage device 23 stores a program executed by the vehicle control system 12 and data used by the vehicle control system 12. The storage device 23 stores information on specifications of the own vehicle (the vehicle 10). The information on the specifications of the own vehicle includes information on size of a tire such as radius or width of the tire of the own vehicle, weight and size of a vehicle body of the own vehicle, and the like.

The input device 24 receives instructions and information input from a user. The input device 24 is, for example, an operation panel, a pointing device such as a mouse or a trackball, or an input device such as a keyboard.

The display device 25 displays a variety of information to the user on board the own vehicle (the vehicle 10). The display device 25 is, for example, a display device such as a liquid crystal display device. The voice output device 26 outputs various voices to the user on board the own vehicle. The voice output device 26 is a speaker. The communication device 27 transmits/receives information to/from an information providing server or the like outside the own vehicle by wireless communication.

The vehicle control device 30 controls a drive mechanism for moving the vehicle 10. For example, when the vehicle 10 is an autonomous driving vehicle, a surrounding situation is determined based on information obtained from the information processing device 40 and other information, and an accelerator amount, a brake amount, a steering angle, and the like are controlled.

The information processing device 40 is, for example, one or more dedicated or general purpose computers. The information processing device 40 manages and controls the one or more sensors 22, the storage device 23, the input device 24, the display device 25, the voice output device 26, the communication device 27, and the vehicle control device 30. The information processing device 40 includes a memory 41 and one or more hardware processors 42.

The memory 41 includes, for example, a read only memory (ROM) 43 and a random access memory (RAM) 44. The ROM 43 stores a program used for controlling the information processing device 40, a variety of setting information, and the like in a non-rewritable manner. The RAM 44 is a volatile storage medium such as synchronous dynamic random access memory (SDRAM). The RAM 44 serves as a work area for the one or more hardware processors 42.

The one or more hardware processors 42 are connected to the memory 41 (the ROM 43 and the RAM 44) via a bus. The one or more hardware processors 42 may include, for example, one or more central processing units (CPUs), or may include one or more graphics processing units (GPUs). Moreover, the one or more hardware processors 42 may include a semiconductor device or the like including a dedicated processing circuit for realizing a neural network.

The one or more hardware processors 42 function as an information generating device 50 by executing various types of processing in cooperation with various programs stored in advance in the ROM 43 or the storage device 23 with the RAM 44 as the work area. The information generating device 50 will be described in detail below.

Figure 3:
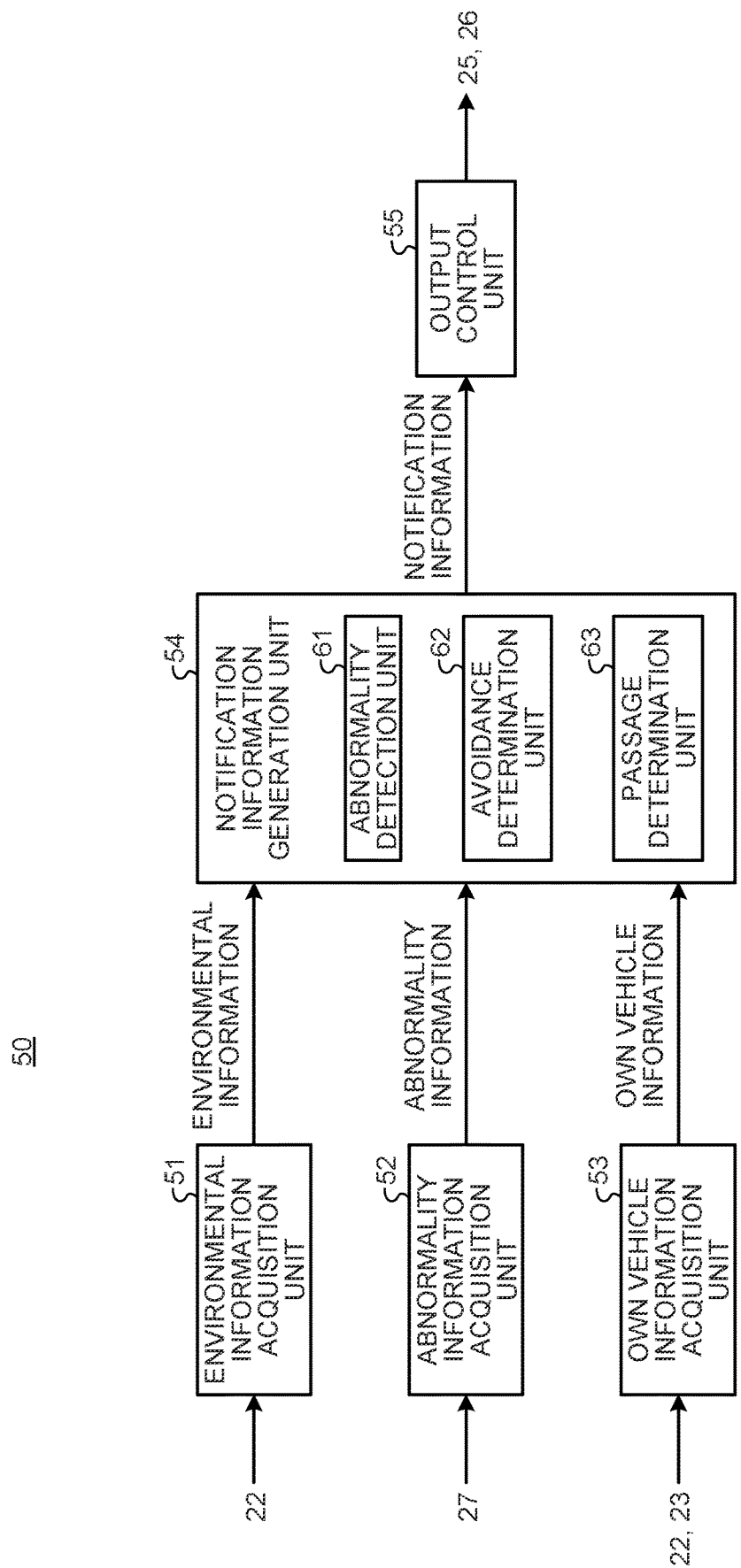
FIG. 3 is a configuration diagram of an information generating device according to a first embodiment.

FIG. 3 is a diagram illustrating a configuration of the information generating device 50 according to the first embodiment. The information generating device 50 includes an environmental information acquisition unit 51, an abnormality information acquisition unit 52, an own vehicle information acquisition unit 53, a notification information generation unit 54, and an output control unit 55.

The environmental information acquisition unit 51, the abnormality information acquisition unit 52, the own vehicle information acquisition unit 53, the notification information generation unit 54, and the output control unit 55 are realized by the one or more hardware processors 42 that execute a predetermined program. That is, by executing the predetermined program, the one or more hardware processors 42 function as the environmental information acquisition unit 51, the abnormality information acquisition unit 52, the own vehicle information acquisition unit 53, the notification information generation unit 54, and the output control unit 55.

The environmental information acquisition unit 51 acquires environmental information indicating a state of environment around the own vehicle (the vehicle 10). The environmental information is generated, for example, based on the sensor information detected by the one or more sensors 22. Moreover, the environmental information may include information acquired from an external information providing server via the communication device 27. The environmental information acquisition unit 51 periodically acquires the environmental information and sends the acquired environmental information to the notification information generation unit 54.

For example, the environmental information includes a captured image obtained by the imaging device that images surroundings of the own vehicle (the vehicle 10). Moreover, the environmental information may include a three-dimensional image obtained by a depth camera or the like that images the surroundings of the own vehicle. For example, the environmental information may include a distance image indicating distance to and a shape of an object around the own vehicle captured by the millimeter wave radar. These captured images, three-dimensional images, and distance images are, for example, images of a front of the own vehicle in a traveling direction, and include a road on which the own vehicle is scheduled to travel, and another vehicle or an obstacle existing on the road on which the own vehicle is scheduled to travel. Moreover, the environmental information may include temperature and humidity around the own vehicle or weather information indicating weather around the own vehicle.

The abnormality information acquisition unit 52 acquires abnormality information indicating an abnormality on a road. The abnormality refers to the one having possibility of affecting traveling of the own vehicle (the vehicle 10). The abnormality information acquisition unit 52 acquires the abnormality information indicating one or more abnormalities on the road from an external information providing server via the communication device 27. For example, the information providing server analyzes information acquired from a plurality of the vehicles 10 or information acquired from a measuring device installed near the road to detect an abnormality existing on the road. Then, the information providing server analyzes the detected abnormality and generates information indicating a position and content of the abnormality with respect to the abnormality. The information providing server provides the abnormality information including information on an abnormality existing in each place to the plurality of vehicles 10 by wireless communication.

Moreover, the abnormality information acquisition unit 52 may add, to the abnormality information acquired from the information providing server, sensor information of the one or more sensors 22 installed in the own vehicle (the vehicle 10). The abnormality information acquisition unit 52 periodically acquires the abnormality information and sends the acquired abnormality information to the notification information generation unit 54.

The abnormality information includes, for example, the position and content for each of one or more abnormalities. The content of the abnormality is, for example, information indicating whether the corresponding abnormality is a scratch or defect on the road, an obstacle existing on the road, or the like. Moreover, when the corresponding abnormality is the scratch or defect on the road, the content of the abnormality may include information indicating a detailed type, such as a hole, a rut, or a crack. Moreover, when the corresponding abnormality is the road scratch or defect, the content of the abnormality may include information indicating the shape of the scratch or defect. In this case, the shape of the scratch or defect may be represented by the width, depth, and height of the scratch or defect.

Moreover, when the corresponding abnormality is an obstacle existing on the road, the content of the abnormality may include information indicating a detailed type and shape of the obstacle. The detailed type of the obstacle may be, for example, an article name. The shape may also include the size of the obstacle. Moreover, when the corresponding abnormality is an obstacle existing on the road, the content of the abnormality may include information indicating whether or not the shape or hardness may damage a tire or vehicle body when the obstacle comes into contact with the tire or the vehicle body.

The own vehicle information acquisition unit 53 acquires own vehicle information including at least one of information on the traveling operation of the own vehicle (the vehicle 10) and information on the specifications of the own vehicle. The own vehicle information acquisition unit 53 periodically acquires the own vehicle information and sends the acquired own vehicle information to the notification information generation unit 54.

The information on the traveling operation of the own vehicle (the vehicle 10) is, for example, information such as the speed and angular velocity of the own vehicle. The information such as the speed and angular velocity of the own vehicle is generated based on, for example, the sensor information detected by the one or more sensors 22. The information on the specifications of the own vehicle includes, for example, information on the size of the tire such as the radius or width of the tire of the own vehicle, the weight and size of the vehicle body of the own vehicle, and the like. The own vehicle information acquisition unit 53 reads out the information on the specifications of the own vehicle from the storage device 23.

The notification information generation unit 54 generates notification information indicating an operation to be performed by the own vehicle (the vehicle 10) against an abnormality on the road, based on the environmental information, the abnormality information, and the own vehicle information. For example, the notification information generation unit 54 periodically generates the notification information and sends the generated notification information to the output control unit 55.

The notification information generation unit 54 includes an abnormality detection unit 61, an avoidance determination unit 62, and a passage determination unit 63.

Based on the abnormality information sent from the abnormality information acquisition unit 52, the abnormality detection unit 61 determines whether or not an abnormality exists on a traveling path of the road on which the own vehicle is scheduled to travel.

When an abnormality exists on the traveling path on the road on which the own vehicle (the vehicle 10) is scheduled to travel, the avoidance determination unit 62 determines whether the own vehicle can avoid the abnormality by traveling on another traveling path based on the abnormality information and the environmental information. When an abnormality exists on the traveling path on the road on which the own vehicle is scheduled to travel, and the own vehicle can avoid the abnormality by traveling on another traveling path, the avoidance determination unit 62 generates information indicating a steering operation for moving the own vehicle to another driving path, as the notification information, in order to avoid the abnormality. Then, the avoidance determination unit 62 sends the notification information indicating the steering operation to the output control unit 55.

When an abnormality exists on the traveling path on the road on which the own vehicle (the vehicle 10) is scheduled to travel and the own vehicle cannot avoid the abnormality by traveling on another traveling path, the passage determination unit 63 determines whether or not the own vehicle can pass over the abnormality based on the abnormality information and the own vehicle information. When the own vehicle can pass over the abnormality, the passage determination unit 63 generates information indicating a traveling operation for the own vehicle to pass over the abnormality, as the notification information. Then, the passage determination unit 63 sends the notification information indicating the traveling operation for the own vehicle to pass over the abnormality to the output control unit 55.

When the own vehicle (the vehicle 10) cannot pass over the abnormality, the passage determination unit 63 generates information indicating a stop operation for the own vehicle to stop before the abnormality, as the notification information. Then, the passage determination unit 63 sends the notification information indicating the stop operation for the own vehicle to stop before the abnormality to the output control unit 55. The output control unit 55 presents the notification information generated by the notification information generation unit 54 to the user who is riding in the own vehicle. For example, the output control unit 55 displays the notification information on the display device 25, or outputs the notification information by voice by the voice output device 26. When the vehicle 10 is an autonomous driving vehicle, the output control unit 55 moreover outputs the notification information to the vehicle control device 30.

Figure 4:
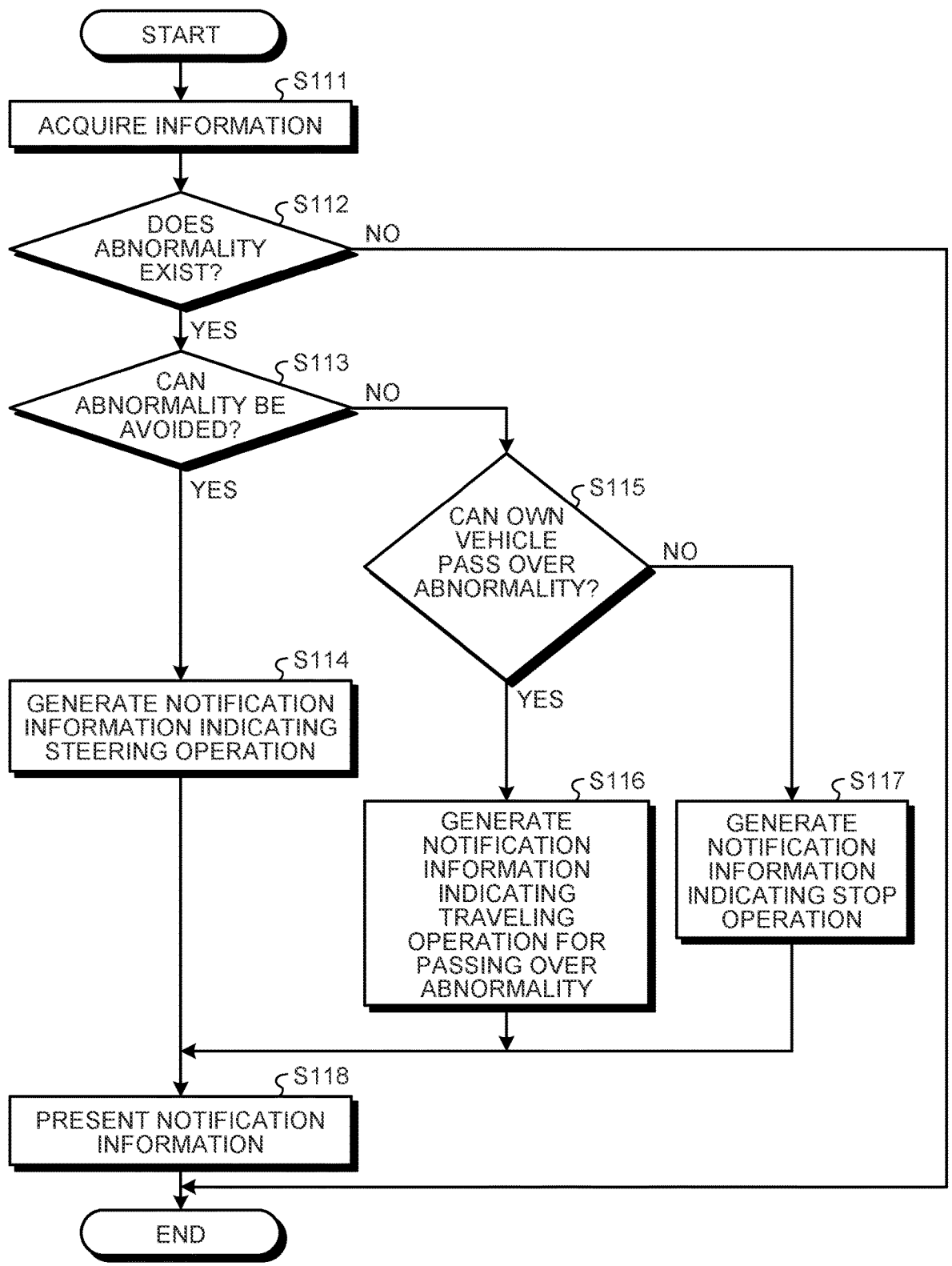
FIG. 4 is a flowchart illustrating a processing flow of the information generating device according to the first embodiment.

FIG. 4 is a flowchart illustrating a processing flow of the information generating device 50 according to the first embodiment. The notification information generation unit 54 and the output control unit 55 execute the processing illustrated in the flowchart of FIG. 4 at regular intervals.

First, in S111, the notification information generation unit 54 acquires the latest environmental information, the latest abnormality information, and the latest own vehicle information.

Subsequently, in S112, the notification information generation unit 54 determines whether or not an abnormality exists on the traveling path of the road on which the own vehicle (the vehicle 10) is scheduled to travel, based on the acquired abnormality information. For example, the notification information generation unit 54 acquires the position of each of the one or more abnormalities included in the abnormality information, and determines whether or not an abnormality exists on the traveling path of the road on which the own vehicle is scheduled to travel.

When no abnormality exists on the traveling path of the road on which the own vehicle is scheduled to travel (No in S112), the notification information generation unit 54 ends this flow without generating information. When an abnormality exists on the traveling path of the road on which the own vehicle is scheduled to travel (Yes in S112), the notification information generation unit 54 advances the processing to S113.

In S113, the notification information generation unit 54 determines whether or not the own vehicle (the vehicle 10)

can avoid the abnormality by traveling on another traveling path, based on the abnormality information and the environmental information. For example, the notification information generation unit 54 determines whether or not the own vehicle can safely avoid the abnormality by performing the steering operation for moving the own vehicle to another traveling path.

More specifically, the notification information generation unit 54 determines whether or not an abnormality exists even on a different traveling path that is arranged side by side with the traveling path on which the abnormality exists, on the road on which the abnormality exists. For example, the notification information generation unit 54 determines whether or not an abnormality exists over all the traveling paths on the road. When an abnormality exists on a traveling path different from the traveling path on which an abnormality exists, the notification information generation unit 54 determines that the abnormality cannot be safely avoided. When no abnormality exists on the traveling path different from the traveling path on which the abnormality exists, the notification information generation unit 54 determines that the abnormality can be safely avoided.

When the own vehicle (the vehicle 10) can avoid the abnormality by traveling on another traveling path (Yes in S113), the notification information generation unit 54 advances the processing to S114. When the own vehicle cannot avoid the abnormality by traveling on another traveling path (No in S113), the notification information generation unit 54 advances the processing to S115.

In S114, the notification information generation unit 54 generates information indicating the steering operation for moving the own vehicle (the vehicle 10) to another traveling path on which no abnormality exists, as the notification information, in order to avoid the abnormality. For example, the notification information generation unit 54 generates the notification information indicating the steering operation for moving to a right traveling path when the other traveling path on which no abnormality exists is on a right side of the traveling path on which the abnormality exists. Moreover, for example, the notification information generation unit 54 generates the notification information indicating the steering operation for moving to a left traveling path when the other traveling path on which no abnormality exists is on a left side of the traveling path on which the abnormality exists.

In S115, the notification information generation unit 54 determines whether or not the own vehicle (the vehicle 10) can pass over the abnormality based on the abnormality information and the own vehicle information. For example, the notification information generation unit 54 determines whether or not the own vehicle can safely pass over the abnormality based on the content of the abnormality indicated by the abnormality information, the information on the traveling operation such as the speed of the own vehicle indicated by the own vehicle information, and the information on the specifications of the own vehicle such as the size of the tire of the own vehicle indicated by the own vehicle information.

More specifically, the notification information generation unit 54 determines that the own vehicle (the vehicle 10) can safely pass over the abnormality when the abnormality is a scratch or defect on the road, the size of the scratch or defect is smaller than a value determined based on the size of the tire of the own vehicle, and the speed of the own vehicle is lower than a predetermined value.

For example, when the width of the scratch or defect is equal to or less than a predetermined ratio of the width of the tire of the own vehicle (the vehicle 10), the notification information generation unit 54 determines that the own vehicle can pass over the abnormality. Moreover, for example, when the depth or height of the scratch or defect is equal to or less than a predetermined ratio of the radius of the tire of the own vehicle, the notification information generation unit 54 determines that the own vehicle can pass over the abnormality.

Moreover, the notification information generation unit 54 determines that the own vehicle (the vehicle 10) cannot pass over the abnormality, when the speed of the own vehicle is equal to or higher than a predetermined speed, even when the width of the scratch or defect is equal to or less than the predetermined ratio of the width of the tire of the own vehicle, and the depth or height of the scratch or defect is equal to or less than the predetermined ratio of the radius of the tire of the own vehicle.

Moreover, the notification information generation unit 54 may change criteria for determining that the own vehicle (the vehicle 10) can pass over the abnormality based on weather information around the own vehicle included in the environmental information. For example, when it is raining around the own vehicle, even if the width, depth or height of the scratch or defect is equal to or less than a predetermined value, for example, water may accumulate in the scratch or defect due to a hydroplaning phenomenon, and slippage and the like may occur. Therefore, the notification information generation unit 54 may determine that the own vehicle cannot pass over the abnormality.

Moreover, when the abnormality is an obstacle placed on the road, the notification information generation unit 54 may determine that the own vehicle (the vehicle 10) cannot pass over the abnormality. Moreover, when the abnormality is an obstacle placed on the road, the notification information generation unit 54 may determine whether or not the own vehicle can pass over the abnormality according to the type of the obstacle. For example, the notification information generation unit 54 determines that the own vehicle cannot pass over the abnormality when the obstacle is a hard or sharp object and is likely to damage the tire or the vehicle body. Moreover, for example, when the obstacle is a soft object and the like and is unlikely to damage the tire or the vehicle body, the notification information generation unit 54 determines that the own vehicle can pass over the abnormality.

When the own vehicle (the vehicle 10) can pass over the abnormality (Yes in S115), the notification information generation unit 54 advances the processing to S116. When the own vehicle cannot pass over the abnormality (No in S115), the notification information generation unit 54 advances the processing to S117.

In S116, the notification information generation unit 54 generates information indicating the traveling operation for the own vehicle to pass over the abnormality as the notification information. For example, the notification information generation unit 54 generates information, as the notification information, for the speed to be set to a predetermined value or less at the position of the abnormality indicated by the abnormality information in order for the own vehicle to pass over the abnormality.

In S117, the notification information generation unit 54 generates information indicating the stop operation for the own vehicle (the vehicle 10) to stop before the abnormality as the notification information. For example, the notification information generation unit 54 generates information, as the notification information, for the own vehicle to stop before the position of the abnormality indicated by the abnormality information in order for the own vehicle to stop before the abnormality.

When any of S114, S116, and S117 is completed, the notification information generation unit 54 advances the processing to S118.

In S118, the output control unit 55 presents the notification information generated by the notification information generation unit 54 to the user riding in the own vehicle (the vehicle 10). For example, the output control unit 55 causes the display device 25 to display the notification information. The display device 25 displays the notification information on, for example, a navigation image that assists the driver's driving operation. Moreover, the output control unit 55 may output the notification information by voice by the voice output device 26. In this way, when the vehicle 10 is a non-autonomous driving vehicle, the output control unit 55 can inform the driver of avoidance operation to be performed against the abnormality existing on the traveling path on the road on which the own vehicle is scheduled to travel.

Moreover, when the vehicle 10 is an autonomous driving vehicle, the output control unit 55 presents the notification information to the user riding in the own vehicle (the vehicle 10) and outputs the notification information to the vehicle control device 30. The vehicle control device 30 controls the vehicle 10 according to the operation indicated by the notification information. As a result, when the vehicle 10 is an autonomous driving vehicle, the output control unit 55 can inform the vehicle control device 30 avoidance operation to be performed against the abnormality existing on the traveling path on the road on which the own vehicle is scheduled to travel. Moreover, when the vehicle 10 is an autonomous driving vehicle, the output control unit 55 can inform the user riding in the own vehicle (the vehicle 10) of avoidance operation to be performed against the abnormality existing on the traveling path on the road on which the own vehicle is scheduled.

The notification information generation unit 54 and the output control unit 55 end this flow when the processing of S118 is completed.

As described above, the information generating device 50 according to the present embodiment is able to generate the notification information indicating an appropriate operation to be performed by the own vehicle (the vehicle 10) when an abnormality exists on a traveling path on a road on which the own vehicle is scheduled to travel, based on the environmental information, the abnormality information, and the own vehicle information. As a result, the driver or the vehicle control device 30 can appropriately drive the own vehicle against the abnormality on the road.

For example, when an abnormality exists on the traveling path on the road on which the own vehicle (the vehicle 10) is scheduled to travel, and the own vehicle can avoid the abnormality by traveling on another traveling path, the information generating device 50 can generate the notification information indicating the steering operation for moving the own vehicle to another traveling path in order to avoid the abnormality. As a result, in such a case, the driver or the vehicle control device 30 can drive the own vehicle so as to move the own vehicle to another traveling path in order to avoid the abnormality.

Moreover, for example, when an abnormality exists in the traveling path on the road on which the own vehicle (the vehicle 10) is scheduled to travel, the own vehicle cannot avoid the abnormality by traveling on another traveling path, and the own vehicle can pass over the abnormality, the information generating device 50 can generate the notification information indicating the traveling operation for moving the own vehicle to pass over the abnormality. As a result, in such a case, the driver or the vehicle control device 30 can drive the own vehicle such that the own vehicle passes over the abnormality.

Moreover, for example, when an abnormality exists in the traveling path on the road on which the own vehicle (the vehicle 10) is scheduled to travel, the own vehicle cannot avoid the abnormality by traveling on another traveling path, and the own vehicle cannot pass over the abnormality, the information generating device 50 can generate the notification information indicating the stop operation for the own vehicle to stop before the abnormality. As a result, in such a case, the driver or the vehicle control device 30 can drive the own vehicle such that the own vehicle stops before the abnormality.

Second Embodiment

Next, a second embodiment will be described. A vehicle 10 according to the second embodiment has substantially the same functions and configurations as those of the first embodiment. In the description of the second embodiment, the same components as those of the first embodiment are designated by the same reference numerals, and detailed description thereof will be omitted except for differences.

Figure 5:
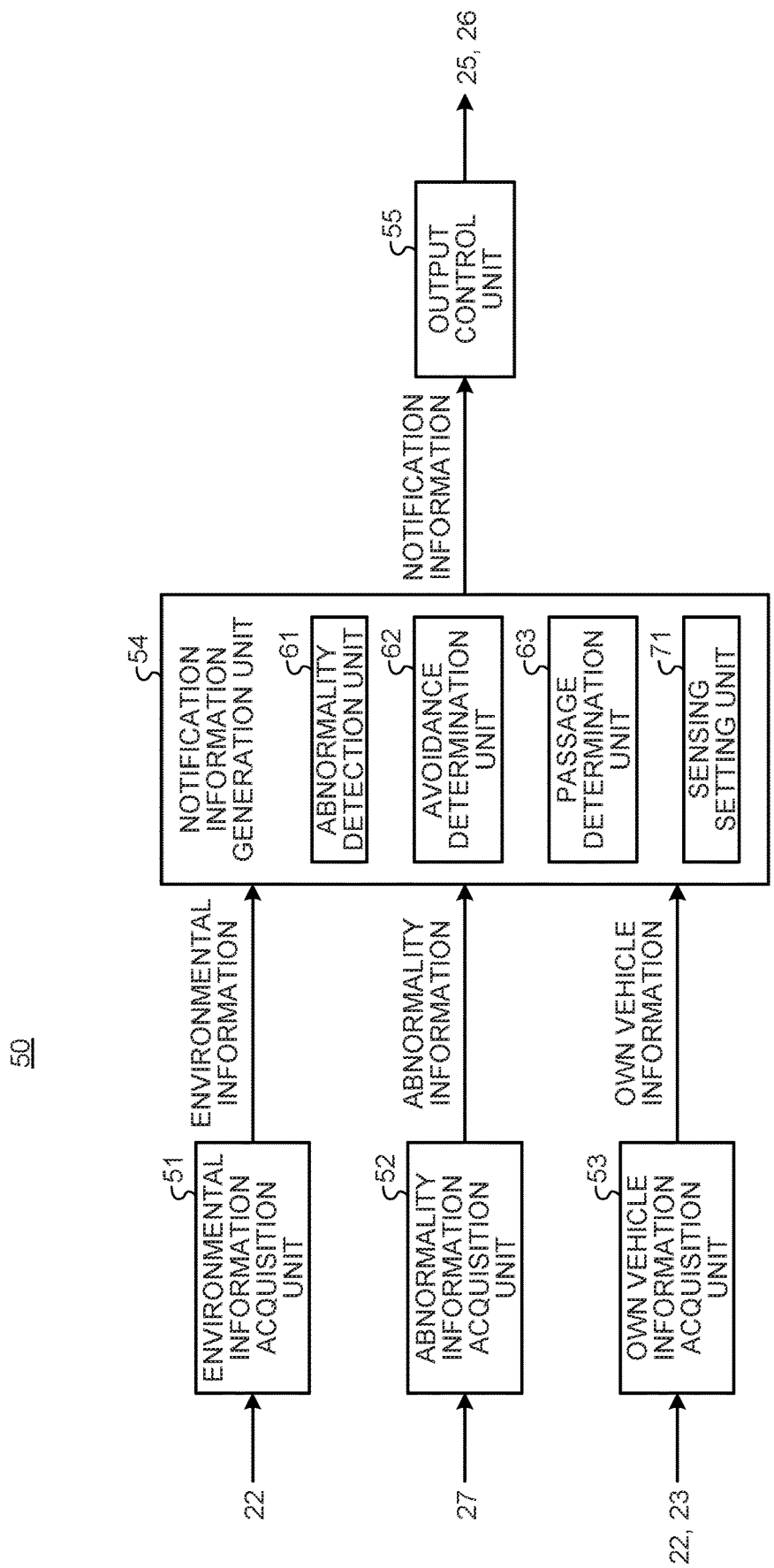
FIG. 5 is a configuration diagram of an information generating device according to a second embodiment.

FIG. 5 is a diagram illustrating a configuration of an information generating device 50 according to the second embodiment. The notification information generation unit 54 according to the first embodiment moreover includes a sensing setting unit 71.

The sensing setting unit 71 sets an operation of the one or more sensors 22 based on the shape of an abnormality on a traveling path of a road on which the own vehicle (the vehicle 10) is scheduled to travel. Then, the notification information generation unit 54 generates sensing setting information indicating operation setting of the sensor 22 for which the operation is set. For example, the notification information generation unit 54 may set resolution of an image captured by an imaging device among the one or more sensors 22 based on the shape of the abnormality.

Moreover, the sensing setting unit 71 may set a sensor 22, among the one or more sensors 22, which outputs sensor information used for generating the environmental information based on the weather information around the own vehicle (the vehicle 10). For example, when it is sunny around the own vehicle, the sensing setting unit 71 sets an image indicating the situation on the road on which the own vehicle travels, which is included in the environmental information, to an image captured by the imaging device among the one or more sensors 22. Moreover, for example, when it is raining around the own vehicle, the notification information generation unit 54 sets an image indicating the situation on the road on which the own vehicle travels, which is included in the environmental information, to a distance image generated by the millimeter wave radar among the one or more sensors 22.

In the second embodiment, the output control unit 55 moreover presents the sensing setting information generated by the notification information generation unit 54 to the user riding in the own vehicle (the vehicle 10). For example, the output control unit 55 causes the display device 25 to display the sensing setting information. Moreover, the output control unit 55 may output the sensing setting information by voice by the voice output device 26.

Figure 6:
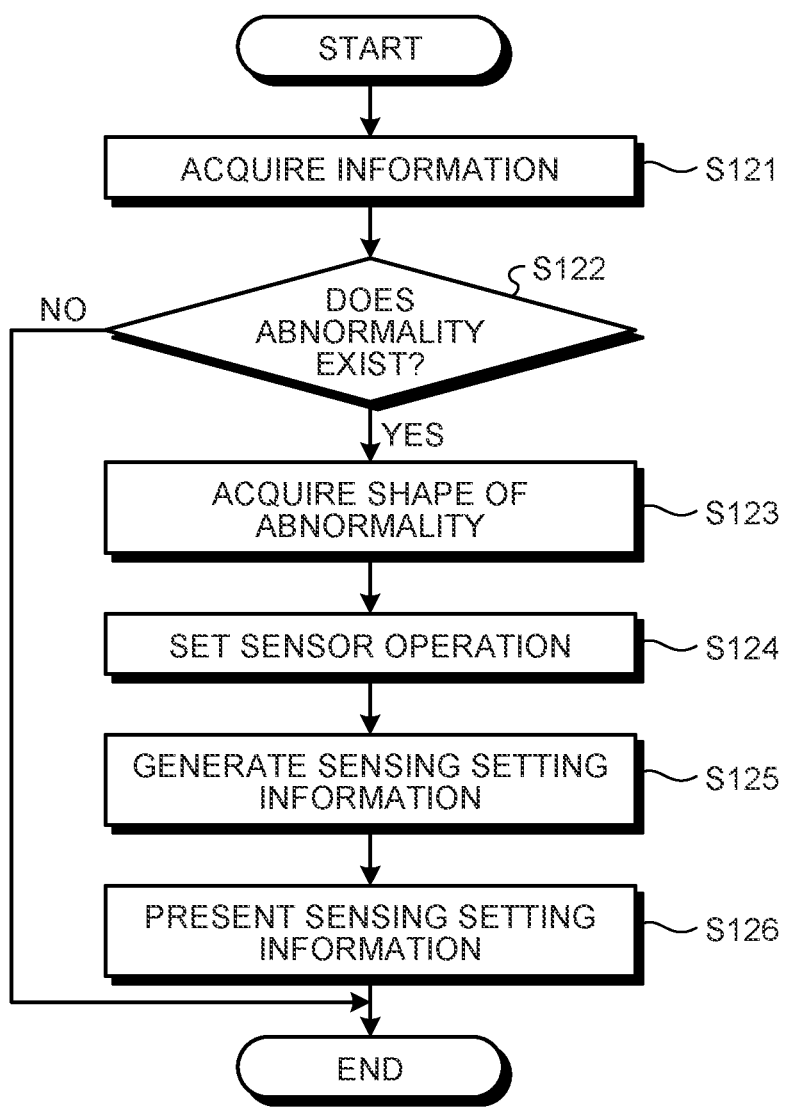
FIG. 6 is a flowchart illustrating a processing flow of the information generating device according to the second embodiment.

FIG. 6 is a flowchart illustrating a processing flow of the information generating device 50 according to the second embodiment. The notification information generation unit 54 and the output control unit 55 according to the second embodiment execute the processing illustrated in the flowchart of FIG. 6 at regular intervals in parallel with the processing illustrated in FIG. 4.

First, in S121, the notification information generation unit 54 acquires the latest abnormality information. Subsequently, in S122, the notification information generation unit 54 determines whether or not an abnormality exists on the traveling path of the road on which the own vehicle (the vehicle 10) is scheduled to travel, based on the acquired abnormality information. When no abnormality exists on the traveling path of the road on which the own vehicle is scheduled to travel (No in S122), the notification information generation unit 54 ends this flow without generating information. When an abnormality exists on the traveling path of the road on which the own vehicle is scheduled to travel (Yes in S122), the notification information generation unit 54 advances the processing to S123.

The processing of S121 and S122 is included in the processing of S111 and S112 illustrated in FIG. 4. Therefore, the notification information generation unit 54 may execute the processing of S121 and S122 in common with the processing of S111 and S112.

In S123, the notification information generation unit 54 acquires the shape of the abnormality on the traveling path of the road on which the own vehicle (the vehicle 10) is scheduled to travel from the acquired abnormality information. The shape of the abnormality is, for example, the size and depth of a hole when the abnormality is a hole, crack or rut in the road. Alternatively, the shape of the abnormality may be a height when the abnormality protrudes from the road.

Subsequently, in S124, the notification information generation unit 54 sets an operation of the one or more sensors 22 based on the shape of the abnormality. For example, when the abnormality is a hole, crack or rut in the road, the notification information generation unit 54 changes the resolution of the image captured by the imaging device, which is one of the one or more sensors 22, according to the size, depth, or height of the abnormality. More specifically, when the size, depth, or height of the abnormality is larger than a predetermined value, the notification information generation unit 54 sets the resolution of the image captured by the imaging device to first resolution, and when the size, depth, or height of the abnormality is equal to or less than the predetermined value, the notification information generation unit 54 sets the resolution of the image to second resolution, which is higher than the first resolution. Moreover, the notification information generation unit 54 may set the resolution of the image stepwise such that the resolution of the image increases as the size, depth or height of the abnormality becomes smaller.

Subsequently, in S125, the notification information generation unit 54 generates the sensing setting information indicating the operation setting of the sensor 22 for which the operation is set in S124. For example, when the resolution of the image captured by the imaging device is changed, the notification information generation unit 54 generates the sensing setting information indicating the resolution of the set image. Then, the notification information generation unit 54 sends the generated sensing setting information to the output control unit 55.

Subsequently, in S126, the output control unit 55 presents the sensing setting information generated by the notification information generation unit 54 to the user riding in the own vehicle (the vehicle 10). For example, the output control unit 55 causes the display device 25 to display the sensing setting information. Moreover, the output control unit 55 may output the sensing setting information by voice by the voice output device 26.

The notification information generation unit 54 and the output control unit 55 end this flow when the processing of S126 is completed.

In S123, the notification information generation unit 54 may acquire the weather information around the own vehicle (the vehicle 10) instead of or in addition to acquiring the shape of the abnormality. In this case, in S124, the notification information generation unit 54 may switch the sensor 22, among the one or more sensors 22, which is used to generate the environmental information based on the weather information around the own vehicle.

For example, when it is sunny around the own vehicle (the vehicle 10), the notification information generation unit 54 sets the image indicating the situation on the road on which the own vehicle travels, which is included in the environmental information, to an image captured by the imaging device among the one or more sensors 22.

Moreover, for example, when it is raining around the own vehicle, the notification information generation unit 54 sets an image indicating the situation on the road on which the own vehicle travels, which is included in the environmental information, to a distance image detected by the millimeter wave radar among the one or more sensors 22. The distance image generated by the millimeter wave radar can detect a surrounding object more robustly with respect to rain than an image captured by the imaging device. Therefore, the notification information generation unit 54 can generate the environmental information that can reliably recognize the situation on the road on which the own vehicle travels when it is raining around the own vehicle.

As described above, when an abnormality exists on the traveling path on the road on which the own vehicle (the vehicle 10) is scheduled to travel, the information generating device 50 according to the present embodiment can set an operation of the one or more sensors 22 that generates the sensor information for generating the environmental information based on the abnormality information or the environmental information. As a result, even when the shape of the abnormality or the weather around the own vehicle changes, the information generating device 50 according to the present embodiment can include the sensor information that can accurately analyze the abnormality on the road in the environmental information.

Third Embodiment

Next, a third embodiment will be described. A vehicle 10 according to the third embodiment has substantially the same functions and configurations as those of the second embodiment. In the description of the third embodiment, the same components as those of the second embodiment are designated by the same reference numerals, and detailed description thereof will be omitted except for differences.

FIG. 7 is a diagram illustrating a configuration of an information generating device 50 according to the third embodiment. The information generating device 50 according to the third embodiment moreover includes an environmental information transmission unit 81.

The environmental information transmission unit 81 acquires the environmental information from the environmental information acquisition unit 51. When an abnormality exists on a traveling path on a road on which the own vehicle (the vehicle 10) is scheduled to travel, the environmental information transmission unit 81 transmits information generated by the own vehicle among the environmental information to an information providing server outside the own vehicle by wireless communication. The information generated by the own vehicle is information generated based on one or more pieces of sensor information detected by the one or more sensors 22 installed in the own vehicle.

For example, the environmental information transmission unit 81 transmits, among the environmental information, an image captured by an imaging device installed in the own vehicle (the vehicle 10), which indicates the state of the traveling path on which the own vehicle travels, to the information providing server. Moreover, for example, the environmental information transmission unit 81 may transmit, among the environmental information, information indicating the shape and size of an object around the own vehicle, which is generated based on a distance image detected by the millimeter wave radar, to the information providing server. As a result, the information providing server can analyze the type and size of the abnormality existing on the road based on the information transmitted from the vehicle 10.

Moreover, in the third embodiment, the notification information generation unit 54 moreover includes a transmission setting unit 82. The transmission setting unit 82 sets an information transmission operation by the environmental information transmission unit 81. The transmission setting unit 82 sets the information transmission operation by the environmental information transmission unit 81 based on the information on the traveling operation of the own vehicle (the vehicle 10). For example, the notification information generation unit 54 sets a transmission interval of information by the environmental information transmission unit 81. Then, the environmental information transmission unit 81 transmits information to the information providing server at a time set by the transmission setting unit 82.

Moreover, the transmission setting unit 82 generates transmission setting information indicating the information transmission operation by the environmental information transmission unit 81. In the third embodiment, the output control unit 55 presents the transmission setting information to the user. For example, the output control unit 55 causes the display device 25 to display the transmission setting information. Moreover, the output control unit 55 may output the transmission setting information by voice by the voice output device 26.

FIG. 8 is a flowchart illustrating a processing flow of the information generating device 50 according to the third embodiment. The notification information generation unit 54 and the output control unit 55 according to the third embodiment execute the processing illustrated in the flowchart of FIG. 8 at regular intervals in parallel with the processing illustrated in FIG. 4 and FIG. 6.

First, in S131, the notification information generation unit 54 acquires the latest abnormality information and the latest own vehicle information. Subsequently, in S132, the notification information generation unit 54 determines whether or not an abnormality exists on the traveling path of the road on which the own vehicle (the vehicle 10) is scheduled to travel, based on the acquired abnormality information. When no abnormality exists on the traveling path of the road on which the own vehicle is scheduled to travel (No in S132), the notification information generation unit 54 ends this flow without generating information. When an abnormality exists on the traveling path of the road on which the own vehicle is scheduled to travel (Yes in S132), the notification information generation unit 54 advances the processing to S133.

The processing of S131 and S132 is included in the processing of S111 and S112 illustrated in FIG. 4. Therefore, the notification information generation unit 54 may execute the processing of S131 and S132 in common with the processing of S111 and S112.

In S133, the notification information generation unit 54 acquires information on the traveling operation of the own vehicle (the vehicle 10) included in the own vehicle information. For example, the notification information generation unit 54 acquires the speed or angular velocity of the own vehicle as the information on the traveling operation of the own vehicle.

Subsequently, in S134, the notification information generation unit 54 sets an information transmission operation by the environmental information transmission unit 81 based on the information on the traveling operation of the own vehicle (the vehicle 10). For example, the notification information generation unit 54 sets a transmission interval of information by the environmental information transmission unit 81.

For example, the notification information generation unit 54 sets a transmission interval of information to a first interval when the speed or angular velocity of the own vehicle (the vehicle 10) is equal to or less than a predetermined value, and the notification information generation unit 54 sets the transmission interval of information to a second interval, which is shorter than the first interval, when the speed or angular velocity of the own vehicle is greater than the predetermined value. Moreover, for example, the notification information generation unit 54 may set the transmission interval of information stepwise such that the transmission interval of information becomes shorter as the speed or angular velocity of the own vehicle increases.

Subsequently, in S135, the notification information generation unit 54 generates the transmission setting information indicating the information transmission setting by the environmental information transmission unit 81. For example, the notification information generation unit 54 generates the transmission setting information indicating the transmission interval of information. Then, the notification information generation unit 54 transmits the generated transmission setting information to the output control unit 55.

Subsequently, in S136, the output control unit 55 presents the transmission setting information generated by the notification information generation unit 54 to the user riding in the own vehicle (the vehicle 10). For example, the output control unit 55 causes the display device 25 to display the transmission setting information. Moreover, the output control unit 55 may output the transmission setting information by voice by the voice output device 26.

The notification information generation unit 54 and the output control unit 55 end this flow when the processing of S136 is completed.

As described above, when an abnormality exists on the traveling path on the road on which the own vehicle (the vehicle 10) is scheduled to travel, the information generating device 50 according to the present embodiment can set an operation of the one or more sensors 22 that generates the sensor information for generating the environmental information based on the abnormality information or the environmental information. As a result, even when the shape of the abnormality or the weather around the own vehicle (the vehicle 10) changes, the information generating device 50 according to the present embodiment can include the sensor information that can accurately analyze the abnormality on the road in the environmental information.

The environmental information transmission unit 81 and the transmission setting unit 82 added in the third embodiment may be incorporated into the information generating device 50 according to the first embodiment.

Fourth Embodiment

Next, a fourth embodiment will be described. A vehicle 10 according to the fourth embodiment has substantially the same functions and configurations as those of the third embodiment. In the description of the fourth embodiment, the same components as those of the third embodiment are designated by the same reference numerals, and detailed description thereof will be omitted except for differences.

FIG. 9 is a diagram illustrating a configuration of an information generating device 50 according to the fourth embodiment. The information generating device 50 according to the fourth embodiment moreover includes an update information receiving unit 91.

The notification information generation unit 54 executes various types of determination processing by using a determination model registered in advance. For example, the notification information generation unit 54 executes determination processing of whether or not an abnormality exists on a traveling path on a road on which the own vehicle (the vehicle 10) is scheduled to travel by using the determination model. In addition, when an abnormality exists, the notification information generation unit 54 executes determination processing of whether or not the own vehicle can avoid the abnormality by traveling on another traveling path, by using the determination model, based on the abnormality information and the environmental information. In addition, when the own vehicle cannot avoid the abnormality by traveling on another traveling path, based on the abnormality information and the own vehicle information, the notification information generation unit 54 executes the determination processing of whether or not the own vehicle can pass over the abnormality by using the determination model.

Moreover, the notification information generation unit 54 also executes generation processing of notification information by using the determination model. For example, the notification information generation unit 54 executes the generation processing of notification information indicating the steering operation for the own vehicle (the vehicle 10) to move to another traveling path in order to avoid the abnormality by using the determination model. In addition, the notification information generation unit 54 executes the notification information indicating the traveling operation for the own vehicle to pass over the abnormality by using the determination model. Moreover, the notification information generation unit 54 executes the notification information indicating the stop operation for the own vehicle to stop before the abnormality by using the determination model.

The update information receiving unit 91 receives update information for updating the determination model from an information providing server outside the own vehicle (the vehicle 10) by wireless communication. For example, when the update information receiving unit 91 is notified that the update information has been updated, the update information receiving unit 91 receives the new update information from the external information providing server. The update information receiving unit 91 may receive the new update information from a server that transmits the abnormality information, or may receive the new update information from a server different from the server that transmits the abnormality information. Then, when the notification information generation unit 54 receives the new update information, the notification information generation unit 54 updates an internally registered determination model based on the update information. As a result, the notification information generation unit 54 can generate the notification information indicating an appropriate operation even for an abnormality that has not been previously expected.

Moreover, in addition to the notification information, the update information receiving unit 91 may update a model for setting an operation of the one or more sensors 22, and a model for setting an operation of transmitting the environmental information to an information providing server outside the own vehicle according to the update information.

As described above, the information generating device 50 according to the present embodiment can sequentially update the criteria for determining the operation to be performed by the own vehicle (the vehicle 10) and the information to be generated with respect to the abnormality information on the road. As a result, the information generating device 50 can output information more appropriate for the situation of the own vehicle. Therefore, the information generating device 50 makes it possible to safely avoid an abnormality such as an obstacle without making unnecessary contact, acquire necessary environmental information, and provide useful information to an external server.

The update information receiving unit 91 added in the fourth embodiment may be incorporated in the information generating device 50 according to the first embodiment and the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information generating device comprising:
one or more hardware processors configured to:
acquire environmental information indicating a state of environment around a vehicle;
acquire, from an information providing server outside the vehicle, abnormality information indicating an abnormality on a road, the abnormality having possibility of affecting traveling of the vehicle;
acquire vehicle information including at least one of information on a traveling operation of the vehicle and information on specifications of the vehicle;
generate notification information indicating an operation to be performed by the vehicle against the abnormality on the road, the notification information being generated based on the environmental information, the abnormality information, and the vehicle information; and
present the notification information to a user riding on the vehicle,
wherein
the vehicle has one or more sensors each detecting sensor information for generating the environmental information; and
the one or more hardware processors are configured to:

in generating the notification information, set a sensing method by the one or more sensors based on the abnormality information and generate sensing setting information indicating the sensing method by the one or more sensors, and in notifying the user, present the sensing setting information to the user.

2. The device according to claim 1, wherein the one or more hardware processors are configured to:

determine, based on the abnormality information, whether or not the abnormality exists on a traveling path on the road on which the vehicle is scheduled to travel;

in response to determining that the abnormality exists, determine based on the abnormality information and the environmental information whether or not the vehicle can avoid the abnormality by traveling on another traveling path; and, in response to determining that the vehicle cannot avoid the abnormality by traveling on another traveling path, determine based on the abnormality information and the vehicle information whether or not the vehicle can pass over the abnormality.

3. The device according to claim 2, wherein, in response to determining that the abnormality exists and the vehicle can avoid the abnormality by traveling on another traveling path, the one or more hardware processors are configured to generate, as the notification information, information indicating a steering operation for moving the vehicle to the other traveling path in order to avoid the abnormality.

4. The device according to claim 2, wherein, in response to determining that the abnormality exists, the vehicle cannot avoid the abnormality by traveling on another traveling path, and the vehicle can pass over the abnormality, the one or more hardware processors are configured to generates, as the notification information, information indicating a traveling operation for the vehicle to pass over the abnormality.

5. The device according to claim 4, wherein, when the abnormality is a scratch or defect on the road, a size of the scratch or defect is smaller than a value determined based on a size of a tire of the vehicle, and a speed of the vehicle is lower than a predetermined value, the one or more hardware processors are configured to determine that the vehicle can pass over the abnormality.

6. The device according to claim 4, wherein, when the abnormality is an obstacle placed on the road, the one or more hardware processors are configured to determine that the vehicle cannot pass over the abnormality.

7. The device according to claim 2, wherein, in response to determining that the abnormality exists, the vehicle cannot avoid the abnormality by traveling on another traveling path, and the vehicle cannot pass over the abnormality, the one or more hardware processors are configured to generates, as the notification information, information indicating a stop operation for the vehicle to stop before the abnormality.

8. The device according to claim 1, wherein the one or more sensors include an imaging device;

the abnormality information includes information indicating a shape of the abnormality; and the one or more hardware processors are configured to change resolution of an image captured by the imaging device and generate sensing setting information indicating the resolution according to the shape of the abnormality.

9. The device according to claim 1, wherein the one or more hardware processors are configured to set, based on weather information around the vehicle, a sensor out of the one or more sensors for outputting sensor information used to generate the environmental information.

10. The device according to claim 1, wherein the one or more hardware processors are configured to:

transmit, to the information providing server outside the vehicle, information generated based on the sensor information detected by the one or more sensors among the environmental information when the abnormality exists on a traveling path on the road on which the vehicle is scheduled to travel;

set a transmission interval of transmitting the information generated based on the sensor information to the information providing server outside the vehicle;

generate transmission setting information indicating a transmission operation for the information generated based on the sensor information; and present the transmission setting information to the user.

11. The device according to claim 10, wherein the one or more hardware processors are configured to set the transmission interval based on information on a traveling operation of the vehicle.

12. The device according to claim 1, wherein the one or more hardware processors are configured to:

generate the notification information based on the environmental information, the abnormality information, and the vehicle information, by using a determination model registered in advance;

receive, from the information providing server outside the vehicle, update information for updating the determination model; and update the determination model based on the received update information.

13. A vehicle control system comprising:

the information generating device according to claim 1; and a vehicle control device that controls an operation of the vehicle in accordance with the notification information.

14. An information generation method implemented by a computer, the method comprising:

acquiring environmental information indicating a state of environment around a vehicle;

acquiring, from an information providing server outside the vehicle, abnormality information indicating an abnormality on a road, the abnormality having possibility of affecting traveling of the vehicle;

acquiring vehicle information including at least one of information on a traveling operation of the vehicle and information on specifications of the vehicle;

generating notification information indicating an operation to be performed by the vehicle against the abnormality on the road, the notification information being generated based on the environmental information, the abnormality information, and the vehicle information; and presenting the notification information to a user riding on the vehicle, wherein the vehicle has one or more sensors each detecting sensor information for generating the environmental information; and the method further comprises:

in generating the notification information, setting a sensing method by the one or more sensors based on the abnormality information and generating sensing setting information indicating the sensing method by the one or more sensors, and in notifying the user, presenting the sensing setting information to the user.

15. A computer program product comprising a non-transitory computer-readable recording medium on which an executable program is recorded, the program instructing a computer to:
- acquire environmental information indicating a state of environment around a vehicle;
- acquire, from an information providing server outside the vehicle, abnormality information indicating an abnormality on a road, the abnormality having possibility of affecting traveling of the vehicle;
- acquire vehicle information including at least one of information on a traveling operation of the vehicle and information on specifications of the vehicle;
- generate notification information indicating an operation to be performed by the vehicle against the abnormality on the road, the notification information being generated based on the environmental information, the abnormality information, and the vehicle information; and
- present the notification information to a user riding on the vehicle,
- wherein the vehicle has one or more sensors each detecting sensor information for generating the environmental information, and
- the program instructs the computer to:
  - in generating the notification information, set a sensing method by the one or more sensors based on the abnormality information and generate sensing setting information indicating the sensing method by the one or more sensors, and
  - in notifying the user, present the sensing setting information to the user.

* * * * *